No. 850,008. PATENTED APR. 9, 1907.
J. HUTCHESON.
GRAIN AND STRAW SEPARATOR.
APPLICATION FILED NOV. 10, 1906.

Witnesses
Frank B. Hoffman

Inventor
James Hutcheson
By Victor J. Evans
Attorney

UNITED STATES PATENT OFFICE.

JAMES HUTCHESON, OF JOHNSON COUNTY, KANSAS.

GRAIN AND STRAW SEPARATOR.

No. 850,008.     Specification of Letters Patent.     Patented April 9, 1907.

Application filed November 10, 1906. Serial No. 342,863.

*To all whom it may concern:*

Be it known that I, JAMES HUTCHESON, a citizen of the United States of America, residing in the county of Johnson and State of Kansas, have invented new and useful Improvements in Grain and Straw Separators, of which the following is a specification.

This invention relates to grain and straw separators designed more particularly as an attachment to threshing-machines; and one of the principal objects of the invention is to provide means for carrying the straw backward after it has passed under the threshing-cylinder and presenting the straw and unthreshed grain to a second beater or threshing-cylinder in order that all the grain and straw may be separated.

Another object of my invention is to provide a rotary straw-carrier having arms projecting through a wire guard or a series of bars which will permit the grain to drop through while the straw is carried backward to be presented to a concave and threshing-cylinder.

These and other objects may be attained by means of the construction illustrated in the accompanying drawings, in which—

Figure 1:
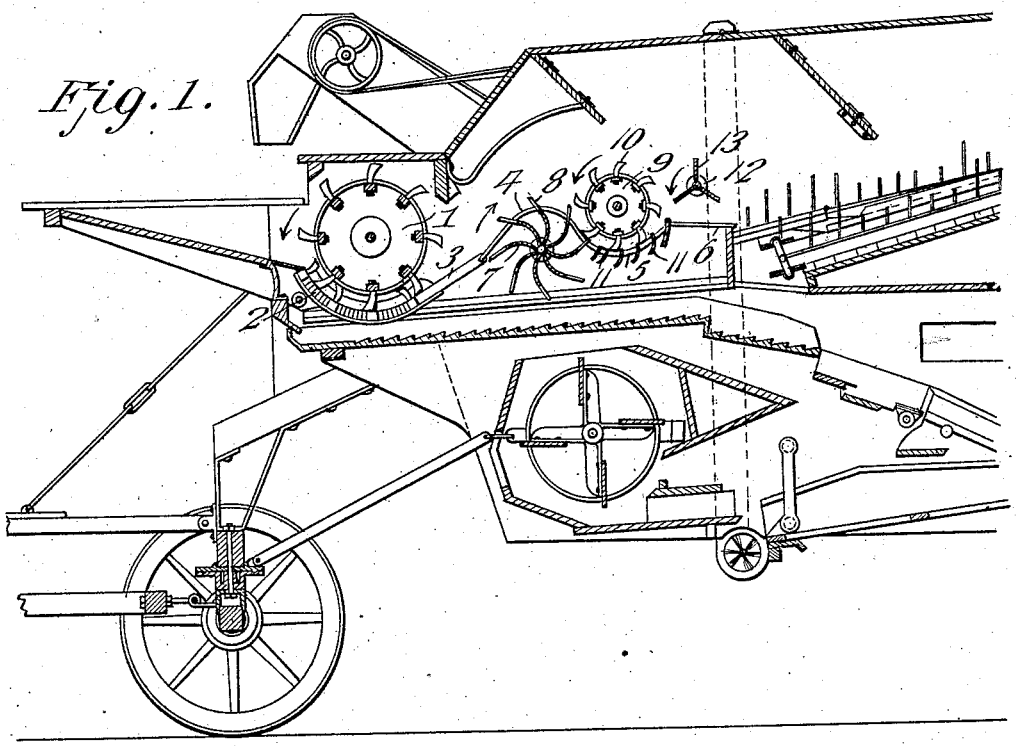
Figure 2:
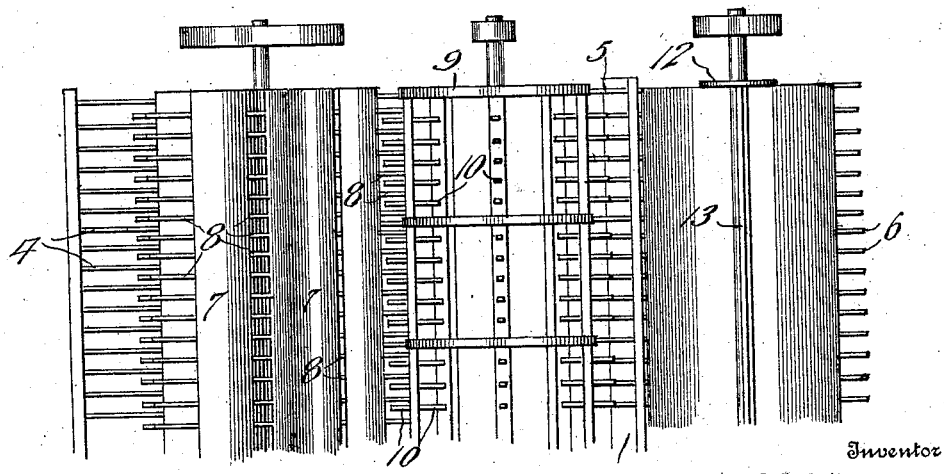

Figure 1 is a longitudinal section through the forward portion of a threshing-machine and showing my improved devices therein. Fig. 2 is a plan view of the same with the upper portion of the machine removed to better illustrate the parts.

Referring to the accompanying drawings for a more particular description of my invention, the numeral 1 designates an ordinary threshing-cylinder, and 2 is the concave in which said cylinder rotates, these parts being of the usual construction. Extending backward from the concave 2 is a bar 3, to which a series of guide bars or rods 4 are secured, said rods or bars extending upward and being continued to form a concave 5 and extending thence backward and supported at 6 upon one of the bars of the machine-frame. Mounted to rotate within the upwardly-extending portion of the straw-guard 4 is a straw-carrier wheel consisting of plates 7, having projecting arms or fingers 8 disposed between the rods or bars 4. The plates 7 are curved and secured to a suitable hub or disk at each end. A threshing-cylinder 9 is mounted in the concave portion 5 of the straw-guide rods, said cylinder provided with the usual teeth 10. Extending downward from the concave portion 5 are a series of curved check-plates 11. Journaled in the rear of the threshing-cylinder 9 is a beater 12, consisting of a number of plates 13, secured to suitable hubs and adapted to be rotated simultaneously with the other rotative parts of the machine.

The operation of my invention may be briefly described as follows: The rotative parts of the machine are revolved in the directions indicated by the arrows in Fig. 1, and the grain and straw being fed in the machine is first presented to the threshing-cylinder 1, from which it is conveyed backward to the fingers 8, which carry the straw over the curved guide-rods 4 and into the concave 5, where the straw and grain are separated, the straw being carried backward to the beater 12 and from thence to the straw-carrier and the grain dropping through between the bars 5, the check-plates 11 serving to prevent the straw from being carried forward to the wheel 7.

From the foregoing it will be obvious that my grain and straw separator will thoroughly separate the grain from the straw after it has passed through the ordinary concave and cylinder and that the result is a very material saving in grain.

Having thus described the invention, what I claim is—

In a grain-separator, the combination of a wheel comprising curved metal plates, fingers projecting from the outer edges of said plates, hubs to which said plates are secured at their outer ends, axles on said hubs, a straw-guide comprising parallel rods or guides between which said fingers are moved, said straw-guide being formed with a concave portion in rear of said wheel, a threshing-cylinder mounted to rotate in said concave portion, a beater mounted in the frame in rear of the threshing-cylinder, and means for rotating the wheel, the threshing-cylinder and the beater, substantially as described.

In testimony whereof I affix my signature in presence of two witnesses.

JAMES HUTCHESON.

Witnesses:
    F. E. MOSSMAN,
    W. N. KIRBY.